US008930995B2

United States Patent
Lee et al.

(10) Patent No.: US 8,930,995 B2
(45) Date of Patent: Jan. 6, 2015

(54) METHOD FOR PROVIDING MULTIPLE FORMATS THROUGH XML BASED EPG SCHEMA IN TERRESTRIAL DMB SYSTEM

(75) Inventors: Kyoung-Shin Lee, Yongin-si (KR); Young-Jip Kim, Suwon-si (KR); Byoung-Dai Lee, Seongnam-si (KR); Yun-Je Oh, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1804 days.

(21) Appl. No.: 11/439,833

(22) Filed: May 23, 2006

(65) Prior Publication Data

US 2006/0265645 A1 Nov. 23, 2006

(30) Foreign Application Priority Data

May 23, 2005 (KR) ........................ 10-2005-0043358

(51) Int. Cl.
*G06F 3/00* (2006.01)
*H04N 21/262* (2011.01)
*H04N 21/8543* (2011.01)
*H04N 21/235* (2011.01)
*H04N 21/435* (2011.01)

(52) U.S. Cl.
CPC ....... *H04N 21/435* (2013.01); *H04N 21/26283* (2013.01); *H04N 21/8543* (2013.01); *H04N 21/235* (2013.01)
USPC ........................................................ 725/39

(58) Field of Classification Search
CPC . H04N 5/44543; H04N 21/482; H04N 21/84; H04N 21/4821; H04N 21/4345
USPC ........................................ 715/234; 725/46, 39
See application file for complete search history.

(56) References Cited

U.S. PATENT DOCUMENTS

| | | | |
|---|---|---|---|
| 2002/0199194 A1* | 12/2002 | Ali | ................................... 725/46 |
| 2003/0110297 A1* | 6/2003 | Tabatabai et al. | ............. 709/246 |
| 2003/0149934 A1* | 8/2003 | Worden | ........................ 715/513 |
| 2004/0040036 A1* | 2/2004 | An | .................................. 725/39 |

FOREIGN PATENT DOCUMENTS

| | | |
|---|---|---|
| KR | 10-2003-0040448 A | 5/2003 |
| KR | 10-2004-0058928 A | 7/2004 |
| KR | 10-2004-0070090 A | 8/2004 |
| KR | 10-2005-0043553 A | 5/2005 |

OTHER PUBLICATIONS

Digita Audio Broadcasting (DAB);XML Specification for DAB Electronic Programme Guide (EPG); ETSI TS 102 818 v1.1.1 (Dec. 2002).*
Convert DAB Binary EPG (ETSI TS 102 371) to DAB XML EPG (ETSI 102 818) veresion 0.1 Jun. 2, 2005 by Nicholas Humfrey a copyright of Southampton University.*

(Continued)

*Primary Examiner* — Benjamin R Bruckart
*Assistant Examiner* — Anthony Bantamoi
(74) *Attorney, Agent, or Firm* — Cha & Reiter, LLC

(57) ABSTRACT

Disclosed is a method for providing multiple formats through an XML based EPG schema in terrestrial DMB system. The method includes the steps of setting a predetermined type in an area for defining type information of the EPG information, setting the defined predetermined type to have at least one format value, and making a definition to convert a format type to the defined predetermined type in an XML schema for expressing the EPG service information.

9 Claims, 2 Drawing Sheets

(56) References Cited

OTHER PUBLICATIONS

ETSI TS 102 818 V 1.2.1 (Jan. 2005).*
Benoit Marchal, XML by example, Sep. 2001, QUE, Second Edition, p. 92-94.*

European Broadcasting Union; ETSI TS 102 818; "Digital Audio Broadcasting (DAB); XML Specification for DAB, Electronic Programme Guide (EPG)"; V1.2.1.; Jan. 2005.

* cited by examiner

METHOD FOR PROVIDING MULTIPLE FORMATS THROUGH XML BASED EPG SCHEMA IN TERRESTRIAL DMB SYSTEM

CLAIM OF PRIORITY

This application claims priority, pursuant to 35 USC 119, to that patent application entitled "Method For Providing Multiple Formats Through XML Based EPG Schema In Terrestrial DMB System," filed in the Korean Intellectual Property Office on May 23, 2005 and assigned Serial No. 2005-43358, the contents of which are hereby incorporated by reference.

BACKGROUND OF THE INVENTION

1. Field of the Invention

The present invention relates to terrestrial Digital Multimedia Broadcasting (DMB), and more particularly to a method for providing an Electronic Program Guide (EPG) schema based on eXtensible Markup Language (XML) in terrestrial DMB.

2. Description of the Related Art

The Digital Multimedia Broadcasting (DMB) is a system standard which the Republic of Korea is trying to build in order to provide a multimedia broadcasting service including video, based on the Digital Audio Broadcasting (DAB; Eureka-147) system. The DAB system is a European digital radio broadcasting standard for providing both a high quality audio service of CD quality and a data service. The DMB includes satellite DMB, which uses satellites as a transmission media, and terrestrial DMB, which uses ground waves as transmission media.

With a DMB system, it is possible to provide not only video information but also various other information types, such as audio and data. Particularly, in the terrestrial DMB, the video, audio, and data services are separately and individually transmitted in a frequency domain referred to as an "Ensemble."

In the terrestrial DMB, it is important to provide EPG (Electronic Programming Guide) information. To this end, the terrestrial DMB proposes to provide information through an XML scheme.

According to the XML scheme, contents and expression of a document are separately transmitted, so that a document maker can make a document without paying attention to the expression of the document. Further, it is possible to express one XML document in various ways by using various style sheet documents.

The XML document by itself is not aimed at expression of information but is aimed at structural storage of information. Therefore, in order to express an XML document by Hyper Text Markup Language (HTML), it is necessary to prepare separate style sheet documents, such as Cascading Style Sheet (CSS) documents or eXtensible Stylesheet Language (XSL) documents.

FIG. 1 is a block diagram of a typical XML document providing system for providing EPG information in a terrestrial DMB, which includes a document maker 100 for making an XML document, a document receiver 200 for receiving the produced XML document in the form of a web document and then translating the received document, and a broadcasting network 14 for interconnecting the document maker 100 and the document receiver 200.

Specifically, the document maker 100 converts an input document 11 to an XML document by using an XML maker 12 and then transfers the XML document to the broadcasting network 14. In order to convert the XML document expressed by only the contents thereof into an HTML document, etc., the document maker 100 further includes a Cascading Style Sheet/eXtensible Stylesheet Language (CSS/XSL) unit 13 which provides style sheet documents.

Further, the document receiver 200 receives the XML document from the broadcasting network 14 and translates the XML document by using an XML translator 15, thereby converting the document into an HTML type document 16.

In order to generate XML-based EPG information for such a terrestrial DMB, the European Telecommunications Standards Institute (ETSI) has built an XML-based EPG standard (ETSI TS 101 818) for Digital Audio Broadcasting (DAB) which proposes an XML schema for data broadcasting.

In general, the EPG information reports information about various services provided to broadcast service users, so that the users can select a broadcast service or related contents which the users want.

The EPG information needs to be flexible as various different terminals are used in the broadcasting network. Therefore, in order to provide EPG information regardless of the different terminal types, the ETSI has defined an XML schema for DAB service using XML.

As described above, the EPG defined by the ETSI is based on the DAB service, and the Telecommunications Technology Association (TTA) of the Republic of Korea is currently doing additional work for the part for the terrestrial DMB service, that is, for the video service-related part.

The XML schema defined in the "ETSI TS 101 818" according to the DAB standard includes service information, schedule information, and group information.

Table 1 shows an example of a schema for the service information from among the XML schemas as described above.

TABLE 1

```
<xs:element name="service" minOccurs="0" maxOccurs="unbounded">
<xs:complexType>
<xs:sequence>
<xs:element name="serviceID" minOccurs="1"
maxOccurs="unbounded">
<xs:complexType>
<xs:attribute name="id" type="epg:dabIDType" use="required"/>
<xs:attribute name="type" default="primary">
<xs:simpleType>
<xs:restriction base="xs:NMTOKEN">
<xs:enumeration value="primary"/>
<xs:enumeration value="secondary"/>
</xs:restriction>
</xs:simpleType>
</xs:attribute>
</xs:complexType>
</xs:element>
<xs:group ref="epg:serviceNameGroup" maxOccurs="unbounded"/>
<xs:element name="mediaDescription" type=
"epg:mediaDescriptionType"
minOccurs="0" maxOccurs="unbounded"/>
<xs:element name="genre" type="epg:genreType" minOccurs="0"
maxOccurs="unbounded"/>
minOccurs="0" maxOccurs="unbounded"/>
<xs:element name="parentalRating" type="epg:parentalRatingType"
minOccurs="0"/>
<xs:element name="CA" type="epg:CAType" minOccurs="0"/>
<xs:element name="keywords" type="epg:keywordsType"
minOccurs="0"/>
<xs:element name="link" type="epg:linkType" minOccurs="0"
maxOccurs="unbounded"/>
</xs:sequence>
<xs:attribute name="version" type="xs:integer"/>
<xs:attribute name="format" default="audio">
<xs:simpleType>
<xs:restriction base="xs:NMTOKEN">
<xs:enumeration value="audio"/>
```

TABLE 1-continued

```
<xs:enumeration value="DLS"/>
<xs:enumeration value="MOTSlideshow"/>
<xs:enumeration value="MOTBWS"/>
<xs:enumeration value="TPEG"/>
<xs:enumeration value="DGPS"/>
<xs:enumeration value="proprietary"/>
</xs:restriction>
</xs:simpleType>
</xs:attribute>
<xs:attribute name="bitrate" type="xs:nonNegativeInteger"/>
</xs:complexType>
</xs:element>
</xs:sequence>
<xs:attribute name="id" type="epg:ensembleIDType" use="required"/>
<xs:attribute name="version" type="xs:integer"/>
</xs:complexType>
</xs:element>
```

In general, the terrestrial DMB service is provided through ensembles, each of which contains information about a specific service. According to the XML structure, an element named "service information" includes a lower layer element named "ensemble," and the element "ensemble" includes a lower layer element named "service." Further, one of the attributes of the element "service" is "format." According to the definition in the DAB standard, "format" may possess one of seven attributes selected from "audio(default)," "Dynamic Layer Service (DLS)," "MOTSlideshow," "MOTBWS," "Transport Protocol Experts Group (TPEG)," "Differential GPS (DGPS)," and "proprietary."

According to the conventional method for providing the EPG information, only one of the seven attributes (audio, DLS, MOTslideshow, MOTBWS, TPEG, aDGPS, and proprietary) can be selected and set as the attribute of the element "format," as shown in Table 1.

The conventional "service" element defined by the "ETSI 101 818" employs an attribute value named "format" to express the property of the service. However, such an attribute value is only one of "audio", "DLS", "MOTSlideshow", "MOTBWS", "TPEG", "DGPS", and "proprietary."

When the "format" is "audio," it implies that the corresponding service provides audio. Or, when the "format" is "DLS," it implies that the corresponding service is an audio providing service which provides DLS along with the audio.

However, according to the conventional EPG schema as described above, the "format" is defined as an attribute and is thus allowed to have only a single value. Therefore, when there are two or more data services related to the audio service, it is impossible to express the data services. However, the terrestrial DMB service can simultaneously provide a service for audio and video combined data. For example, while a user is listening to a song (audio), words of the song may be simultaneously displayed on a screen by using the DLS. Or, while a user is viewing a video, the user may navigate web sites in relation to the video program by using a BWS browser or a downloaded application program.

Hence, the current terrestrial DMB provides various types of services, which may go beyond the range of expression defined in the existing EPG schema.

SUMMARY OF THE INVENTION

Accordingly, the present invention has been made to solve the above-mentioned problems occurring in the prior art, and an object of the present invention is to provide an XML based schema method providing for EPG information used in a terrestrial DMB system, which has solved the problem of the existing terrestrial DMB service being unable to select more than one format to express EPG information, and can set a single service to simultaneously have multiple formats.

In one embodiment, there is provided a method for providing multiple formats through an Electronic Program Guide (EPG) schema based on eXtensible Markup Language (XML) in terrestrial Digital Multimedia Broadcasting (DMB), the method comprising the steps of setting a predetermined type in an area for defining type information of the EPG information, setting the defined predetermined type to have at least one format value, and making a definition to convert a format type to the defined predetermined type in an XML schema for expressing the EPG service information.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
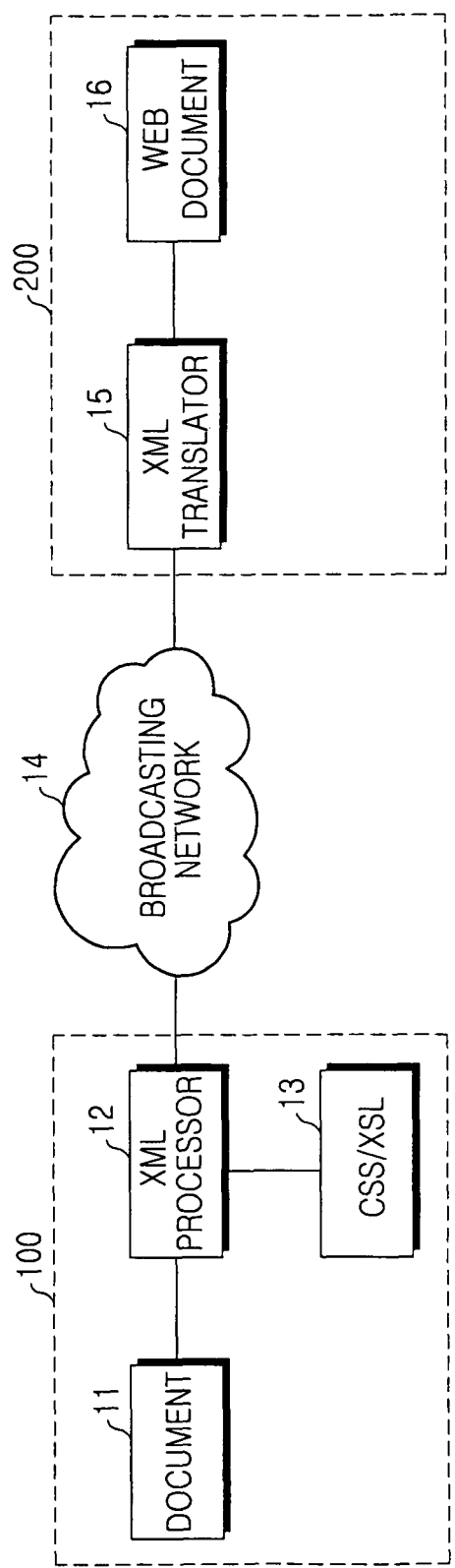
FIG. 1 is a block diagram of a typical XML document providing system for providing EPG information in a terrestrial DMB according to an embodiment of the present invention.
Figure 2:
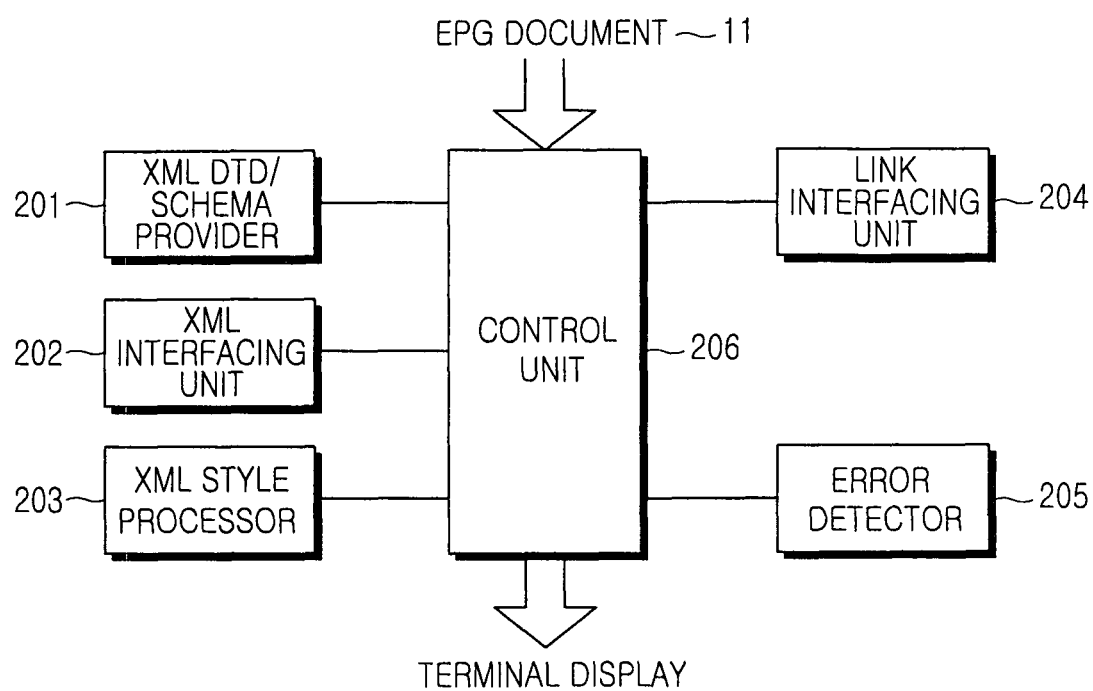
FIG. 2 is a block diagram of an XML based editing apparatus for providing an XML based EPG schema according to an embodiment of the present invention.

FIG. 2 is a block diagram of an XML based editing apparatus for providing an XML based EPG schema according to an embodiment of the present invention.

Referring to FIG. 2, the XML based editing apparatus includes an XML Document Type Definition (DTD)/schema provider 201 for defining elements according to the XML structure for an input EPG document 11, an XML interfacing unit 202 for providing an application program interface for the EPG document 11, an XML style processor 203 for processing style information for a document sent and expressed as EPG information through DMB broadcasting, a link interfacing unit 204 for supporting a link function for the contents of the document, an error detector 205 for error checking through parsing operation for a produced XML document, and a control unit 206 for receiving the EPG document 11, converting the EPG document 11 into an XML document through control of each element thereof, and implementing and expressing EPG information on broadcasting from the document.

Specifically, the XML DTD/schema provider 201 provides an XML DTD or XML schema for the input EPG document 11 under the control of the control unit 206. The XML DTD or XML schema is arranged in order to define elements of the XML. The XML is available for various usages. Therefore, in order to exchange XML data between parties for a particular object, an engagement between the parties exchanging the data, (i.e., a definition of the elements) is necessary. For such a definition of the elements, the XML DTD or XML schema has been arranged. An embodiment of the present invention proposes a new schema for an XML based EPG in a terrestrial DMB.

The XML interfacing unit 202 provides an application program interface under the control of the control unit 206. That is, when the EPG document 11 includes data from an exterior application program server device, the XML interfacing unit 202 provides an interface for the exterior application program server device in order to process this data. For such interfaces, Simple API for XML (SAX) and Document Object Model (DOM) are representatives.

First, the DOM is a programming interface standard which is being developed by W3C that enables a programmer to convert or edit HTML pages or XML documents into program objects. The SAX is an application program interface which has been proposed as an alternative for the DOM that enables analysis of web files using XML. The SAX is a simpler interface than the DOM. Although the SAX is proper for the case where it is necessary to process many files or a large file, the SAX has less functions capable of operating contents of data than the DOM.

Further, the SAX is an event-oriented interface. Therefore, when occurable events have been set in advance, the SAX can deal with an occurred event with a control authority.

The XML style processor 203 processes style information for the document which is sent and expressed through a network, such as the internet. To this end, the XML style processor 203 uses eXtensible Stylesheet Language (XSL) or Cascading Style Sheet (CSS).

The XSL is used to make style sheets that describe how the data sent through the network using XML looks to users. Further, the CSS is a style sheet for a web page, and clarifies the ranks of style elements whenever there is a definition of incompatible style elements. Further, the CSS is used to define possible style sheets and sentences which can determine how a given element can be expressed on a web page.

The link interfacing unit 204 supports the link function in relation to contents of an EPG document under the control of the control unit 206 and is usually executed through XLink. The Xlink enables a link function of 1:N, and can be set to indicate a portion of an EPG document by using an XPointer.

The error detector 205 determines under the control of the control unit 206 if the produced XML document has an error. In order to check for errors, a parsing operation by an XML parser is used.

As described above, the present invention proposes a new type of schema for service information, which can be used in constructing XML based EPG information in a terrestrial DMB system. That is, the present invention defines the elements and enables more efficient expression of information through EPG in a terrestrial DMB system.

In the method of providing EPG information through an EPG providing apparatus as described above, in order to provide multiple "formats" for a single service, the present invention proposes a new type.

To this end, the present invention proposes a new type named "formatType," and changes the type of "format" in epgSI for EPG in relation to the existing service information into the newly defined "formatType." Further, the present invention sets the formats to have multiple values in the XML file regarding the epgSI information.

According to the present invention, the schema defined in relation to the EPG information in a terrestrial DMB system is one of the three types including "epgDataTypes," "epgSchedule," and "epgSI." From among those, the schemas, which must be modified according to the present invention, are "epgDataTypes" and "epgSI."

First, new type information is defined in the "epgDataTypes" which defines the type information for the EPG information.

Specifically, in the "epgDataTypes," a new type named "formatType" is defined and added as shown in Table 2. Further, the defined "formatType" is defined as a regular expression and is defined to necessarily have one or more "format" values, each of which is separated by a comma (,).

TABLE 2

```
<!--
################################################################
#######-->
<!--Definition of formatType-->
<!--
################################################################
#######-->
<xs:simpleType name="formatType">
   <xs:restriction base="xs:string">
      <xs:whiteSpace value="collapse" />
      <xs:pattern
value="((audio)|(DLS)|(MOTSlideshow)|(MOTBWS)|(TPEG)|(DGPS))
       ((,audio)|(,DLS)|(,MOTSlideshow)|(,MOTBWS)|(,TPEG)|(,DGP
S))*" />
   </xs:restriction>
</xs:simpleType>
<!---->
```

Further, in the "epgSI" for describing the EPG service information, the type of "format" is "NMTOKEN" similar to that described in the conventional schema, shown in Table 1. It is possible to consider the "NMTOKEN" as a character string, and the "NMTOKEN" should satisfy a restriction for naming of XML.

An embodiment of the present invention proposes a new schema by modifying the "NMTOKEN" to "epg:formatType." Therefore, in an actual XML file, for example, by setting "format=audio,DLS,TPEG" it is possible to appoint multiple formats for a single service to express the service by EPG.

As described above, the present invention newly defines a schema for expression of EPG information and thus enables appointment of various formats for one service in a terrestrial DMB system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing multiple formats through an Electronic Program Guide (EPG) schema based on eXtensible Markup Language (XML) in terrestrial Digital Multimedia Broadcasting (DMB) system, the method comprising the steps of:

(1) setting, by a control unit, a predetermined format type for defining type information of EPG information in an EPG document to have format values of combined multiple data services simultaneously provided by a single service including the combined multiple data services; and (2) converting, by the control unit, a format type permitting only a single attribute to the predetermined format type having simultaneous multiple format values of the single service in an XML schema document for providing the simultaneous multiple format values of the combined multiple data services associated the single service, wherein the combined multiple data services include audio, Dynamic Layer service (DLS), Multimedia Object Transfer (MOT) Slideshow, MOT Broadcasting Website Service (MOTBWS), Transport Protocol Expert Group (TPEG), and Differential GPS (DGPS).

2. The method as claimed in claim 1, wherein, in step (1), a pattern for the predetermined type is defined as a regular expression and is defined to necessarily have two or more format values each of which is separated by a comma.

3. The method as claimed in claim 1, wherein setting of the predetermined type is accomplished by us a table in the form of,

```
<!--
##############################################################
#####-->
<!--Definition of formatType-->
<!--
##############################################################
#####-->
<xs:simpleType name="formatType">
   <xs:restriction base="xs:string">
      <xs:whiteSpace value="collapse"/>
      <xs:pattern
value="((audio)|(DLS)|(MOTSlideshow)|(MOTBWS)|(TPEG)|(DGPS))
      ((,audio)|(,DLS)|(,MOTSlideshow)|(,MOTBWS)|(,TPEG)|(,DGPS))
*" />
   </xs:restriction>
</xs:simpleType>
<!---->.
```

4. The method as claimed in claim 3, wherein in step (2), the predetermined format type is made in the form of:
format="a,b,c,d,e,f",
wherein the values associated with a, b, c, d, e, and f are selected from the group consisting of: "audio(default)," "DLS," "MOTSlideshow," "MOTBWS," "TPEG," "DGPS," and "proprietary".

5. The method as claimed in claim 1, wherein a schema set by the control unit includes "epgDataTypes" and "epgSI", and wherein "epgDataTypes" defines the type information for EPG service information and "epgSI" describes EPG service information.

6. A device for providing an Electronic Program Guide (EPG) schema document based on eXtensible Markup Language (XML) providing multiple formats by an XML schema providing system receiving EPG information that transforms the information into an XML schema document, the device comprising:
a control unit configured to:
(1) set a predetermined format type for defining type information of EPG information in an EPG document to have format values of combined multiple data services simultaneously provided by a single service including the combined multiple data services; and
(2) convert a format type permitting only a single attribute to the predetermined format type having simultaneous multiple format values of the single service in an XML schema document for providing the simultaneous multiple format values of the combined multiple data services associated the single service,
wherein the combined multiple data services include audio, Dynamic Layer service (DLS), Multimedia Object Transfer (MOT) Slideshow, MOT Broadcasting Website Service (MOTBWS), Transport Protocol Expert Group (TPEG), and Differential GPS (DGPS).

7. The device as claimed in claim 6, wherein setting of the predetermined type is accomplished by using a table in the form of:

```
<!--
##############################################################
#####-->
<!--Definition of formatType-->
<!--
##############################################################
#####-->
<xs:simpleType name="formatType">
   <xs:restriction base="xs:string">
      <xs:whiteSpace value="collapse" />
      <xs:pattern
value="((audio)|(DLS)|(MOTSlideshow)|(MOTBWS)|(TPEG)|(DGPS))
      ((,audio)|(,DLS)|(,MOTSlideshow)|(,MOTBWS)|(,TPEG)|(,DGPS))
*" />
   </xs:restriction>
</xs:simpleType>
<!---->.
```

8. The device as claimed in claim 6, wherein a schema set by control unit includes "epgDataTypes", "epgSI", and wherein "epgDataTypes" defines the type information for EPG service information and "epgSI" describes EPG service information.

9. The device as claimed in claim 6, wherein the predetermined format type is made in the form of:
format="a,b,c,d,e,f",
wherein the values associated with a, b, c, d, e, and f are selected from the group consisting of: "audio(default)," "DLS," "MOTSlideshow," "MOTBWS," "TPEG," "DGPS," and "proprietary".

* * * * *

UNITED STATES PATENT AND TRADEMARK OFFICE
CERTIFICATE OF CORRECTION

Page 1 of 1

PATENT NO.         : 8,930,995 B2
APPLICATION NO.    : 11/439833
DATED              : January 6, 2015
INVENTOR(S)        : Kyoung-Shin Lee et al.

It is certified that error appears in the above-identified patent and that said Letters Patent is hereby corrected as shown below:

In the claims,

Column 6, Claim 1, Line 59 should read as follows:
--...by a control unit...--

Column 6, Claim 1, Line 64 should read as follows:
--...associated with the single...--

Column 7, Claim 3, Line 8 should read as follows:
--...by using a table...--

Column 7, Claim 4, Line 33 should read as follows:
--..."DGPS," and "proprietary."...--

Column 8, Claim 6, Line 9 should read as follows:
--...associated with the single...--

Column 8, Claim 9, Line 46 should read as follows:
--..."DGPS," and "proprietary."...--

Signed and Sealed this
Twenty-first Day of April, 2015

Michelle K. Lee
*Director of the United States Patent and Trademark Office*